Figure 1:
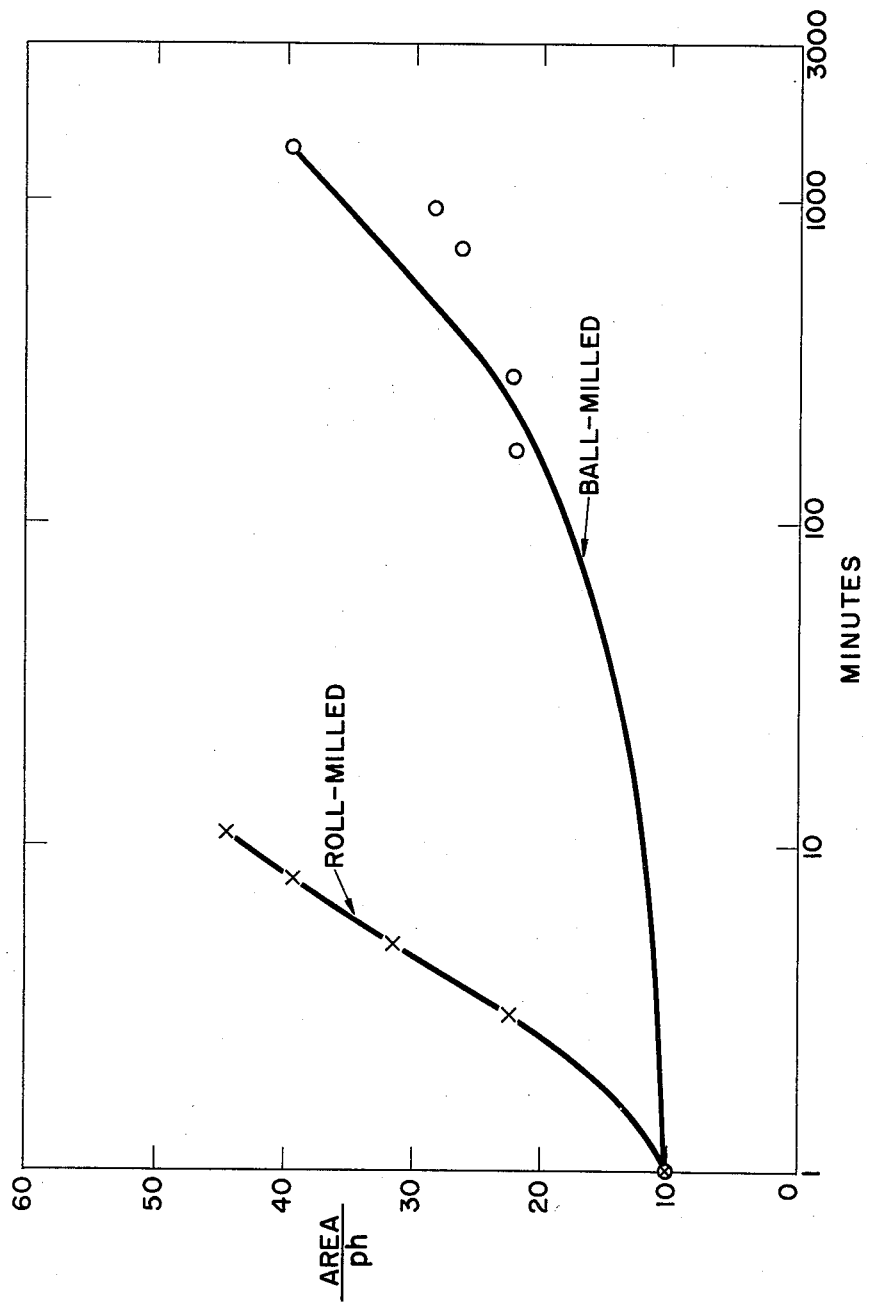

Sept. 18, 1962 A. M. GESSLER 3,054,662
MAKING IMPROVED CARBON BLACK
Filed Dec. 31, 1958 3 Sheets-Sheet 1

Albert M. Gessler    Inventor
By *W. H. Singers*   Attorney

Sept. 18, 1962 A. M. GESSLER 3,054,662
MAKING IMPROVED CARBON BLACK
Filed Dec. 31, 1958 3 Sheets-Sheet 3

Albert M. Gessler  Inventor

By  H. H. Singers  Attorney 3,054,662
MAKING IMPROVED CARBON BLACK
Albert M. Gessler, Cranford, N.J., assignor to Esso Research and Engineering Company, a corporation of Delaware
Filed Dec. 31, 1958, Ser. No. 784,207
1 Claim. (Cl. 23—209.1)

This invention relates to a method of improving the properties of carbon black, particularly for use as reinforcing agent in rubber compositions.

In copending applications Serial No. 663,002, filed June 3, 1957, and Serial No. 684,643, filed September 18, 1957, and now abandoned, of which the present application is a continuation-in-part, it is disclosed that the rubber-reinforcing properties of various types of carbon black can be very substantially improved by subjecting the carbon black to severe attrition, particularly as by ball-milling with steel balls for a period of 1 to 24 hours, to impart to the carbon black an X value in the range of about 80 to 200 where:

$$X = \frac{2000 + 100 \times A}{pH \times S}$$

where A is the area (in acres per pound), and S is the structure (in gallons of oil absorbed per 100 pounds carbon black). Grinding between tightly set steel rolls is also disclosed.

It has now been found, and is the essence of the present invention, that the grinding or shearing type of attrition between steel rolls is not only far more effective and faster than the impact type of attrition ball-milling, but also produces different physical and chemical changes than the ball-milling does. Thus, as to speed, for instance, passing furnace black through a pair of closely set steel rolls, in three quick passes of about 1 or 2 minutes each, will produce improvements in the "X" value, roughly equivalent to those obtained with about 10 to 15 hours of steel ball-milling. Furthermore, it is believed that the physical and chemical changes imparted by the grinding are of a different type or relationship than those produced by ball-milling. Thus, attrition through tight steel rolls (which will be called "roll-milling") generally effects a relatively greater reduction in the structure and increase in area of the carbon black for any given reduction in the pH value, compared to that obtained with ball-milling. Furthermore, attrition by steel rolls is accompanied by a much higher exothermic heat, and results in temperature rises up to 700° F. or more, whereas the temperatures obtained with ball-milling with steel balls generally does not exceed 120–140° F.

Ball-milling starts, during the first 4 hours, primarily and rapidly with reduction of pH value, and a reduction in structure, but with little or no substantial increase in area; whereas roll-milling is accompanied at the very outset, i.e., in the first pass through the steel rolls, with a very great increase in area, amounting to, for instance, 30 to 50% increase in area, but is also accompanied by a substantial reduction in pH and structure. As the roll-milling continues, the changes in all three of these properties continues to change fairly steadily until the desired final improvements in properties have been made; whereas, with ball-milling, after the first 4 hours in which the area has generally not been increased more than 10 or 20%, continued ball-milling, i.e., to 8, 12, 16 and finally 24 hours, then effects a very rapid increase in area, but with relatively little or no further change in pH from the value attained during the first 4 hours. These facts indicate that the mechanism of the physical and chemical changes in the carbon black caused by roll-milling is very different from that caused by ball-milling.

Most importantly, since the largest commercial use of carbon black is for reinforcement of rubber in making tires for autos, airplanes, etc., it is important to note that the rapidly roll-milled carbon black when mixed with rubber, such as butyl rubber, and cured, results in vulcanizates at least as good as, or even somewhat superior to, corresponding vulcanizates containing the more slowly ball-milled carbon black.

In order to judge how extensive the attrition of the carbon black should be, for some purposes it is best to use the previously referred to "X value" where:

$$X = \frac{2000 + 100 \times A}{pH \times S}$$

where A is the area (in acres per pound), and S is the structure (in gallons of oil absorbed per 100 pounds of carbon black). If this formula is used, it is normally preferred to carry out roll-milling attrition until X has increased from an unattrited range of about 10 to 75 up to an attrited value of about 80 to 200, preferably above 130.

On the other hand, it has been found sufficient for some purposes to use a somewhat simpler and quicker method of judging the degree of attrition by merely calculating the value of:

$$\frac{\text{Area } (M^2/gm.)}{pH}$$

This value before attrition generally ranges from about 1 to 40, usually about 2 to 30, and should, after roll-attrition, have a value from 2-fold to 10-fold, generally 3-fold to 6-fold, higher, or namely an area/pH value of about 3 to 100, preferably about 20 to 80. The actual values involved both before and after attrition, will, of course, depend greatly on the nature of the particular carbon black being attrited, because in the unattrited state, channel blacks normally have a relatively high area/pH value ranging from about 30 to 50, whereas fine thermal blacks have a relatively low area/pH value of about 2 to 5, and other blacks such as furnace blacks, acetylene blacks, etc. usually have intermediate values.

In carrying out the roll-attrition of the present invention, it is desirable to have the rolls, such as steel rolls, set very tightly, at least closer than 50 mils, and preferably to a range of about 5 to 20 mils, as for instance 7, 10, or 15 mils. It is desirable that the roll speed ratio be between the limits of about 10:1 to 1:1 so that the carbon black passing between the rolls will be subjected to shearing action as well as grinding due to passing through the tight rolls. The speed at which the carbon black may be passed through the rolls will depend on a number of factors including the nature of the carbon black, the tightness of the roll setting, etc., but normally should be within the range of about 5 to 50, preferably about 10 to 30 grams per inch of roll width per minute in each pass through the rolls. The temperature of the rolls may be either left uncontrolled, and permitted to warm up due to the exothermic heat of the roll-attrition or, as is preferred, the rolls may be preheated to 200 to 500° F. or higher, suitably to about 250 to 400° F. before starting the roll-attrition. The carbon black per se, of course, may be roll-attrited directly without any pretreatment of any sort or may, as preferable, be either dried, or heated, or both dried and heated. During the roll-attrition of the carbon black the temperature, due to exothermic reaction caused essentially by oxidation of the black, may rise to as high as 500 to 900° F. or higher, and quite commonly to about 600 to 800° F., particularly as a result of the first pass through the rolls. The product may be given a number of passes through the rolls, depending upon the degree of attrition desired as well as upon the severity of attrition given in any one pass.

The exact nature of the physical and chemical reactions which take place during the roll-attrition of the carbon black is not thoroughly understood but can, of course, be partly surmised from the physical results of increase in area and decrease in structure, as well as the chemical effects of lowering the pH, and increasing the oxygen content. It is believed that the breaking of the structure of the black involves at least to some extent the breaking of carbon-to-carbon bonds, because it appears to make some of the particles electron-deficient and some of the particles electron-rich. The electron-deficient carbon black particles readily accept electrons from an electron donor such as oxygen, whether present during the roll-attrition, or contacted with the carbon black after the attrition. Thus, by controlling the conditions and chemical atmosphere to which the carbon black is exposed during the roll-milling, it is possible to effect a control of the chemical modification of the black, and thus for example adding chemical functionality onto the surface of the black particles, i.e., olefins, acids, ethers, ketones, nitrogen containing compounds such as amines or amides, halogens, sulfur and sulfur containing compounds, and many others.

By reason of the breaking of a carbon black particle, for instance represented by the letters AB, by roll-milling, into two separate particles A and B, some of which are electron-deficient and others electron-rich and some of which show paramagnetic properties and some non-magnetic properties, it becomes possible to separate these particles into two different fractions A and B by use of a magnetic separator. For instance, the freshly roll-milled carbon black can preferably be permitted to drop directly onto a belt conveyor which passes around a rotary drum-type magnetic separator, so that the non-magnetic particles will be thrown off first from the belt conveyor due to momentum and centrifugal force and permitted to drop into one bin, while the attrited carbon black particles having magnetic properties will be carried underneath the magnetic separator and discharged where the belt conveyor pulls away from the magnetic separator, and deposited in a separate bin. If desired, the resulting two different kinds of roll-attrited carbon black can then be compounded with natural or synthetic rubber and curatives and cured to make vulcanizates reinforced with either non-magnetic type or paramagnetic type of attrited carbon black.

Various types of carbon black can be used, depending upon the type of industrial application to which the roll-attrited carbon black will be used. Acetylene blacks which normally have a relatively high structure will show relatively the greatest improvement by roll-milling, as it is relatively easier to effect a great reduction in the structure and also a relatively large increase in the area. On the other hand, the fine thermal blacks which already have a relatively low structure value are more difficult to break down structurally, and it is more difficult to effect a large increase in the area and a decrease in the pH. Both the high abrasion furnace blacks and high modulus furnace blacks give quite good response to the roll-milling giving improvements which are intermediate between those obtained with the acetylene and the fine thermal blacks. As to channel blacks, some improvement can be made due partly to increase in area and a slight reduction in structure, but since the pH of the channel blacks is normally around 4 to 5, it is difficult to reduce this pH very much percentagewise.

As mentioned in the two above-referred to patent applications, the severely attrited carbon black has many different uses, but one of the most important is as reinforcing agent for butyl rubber which is a synthetic high molecular weight rubbery copolymer of a major proportion of an isoolefin and a minor proportion of a multiolefin. It may be made as described in U.S. Patent 2,356,-128, or in Ind. & Eng. Chem. vol. 32 (October 1940), page 1284, and is preferably a copolymer containing about 0.5 up to 15% of combined conjugated diolefin of 4 to 6 carbon atoms, e.g. butadiene, isoprene, cyclopentadiene, etc., and the balance of an isoolefin of 4 to 6 carbon atoms, e.g. isobutylene, 2-$CH_3$ butene-1, etc., alone or with 0.1–0.8% or more of divinylbenzene, dimethallyl, etc., or with about 0.5 to 10% or so of styrene, p-$CH_3$ styrene, indene, etc., the copolymer preferably having a Staudinger molecular weight of at least 20,000 up to 300,000 or so, and an iodine number (Wijs) of about 0.5 to 50. On account of its relatively low unsaturation (compared to an iodine number of 350 for natural rubber, and about 250 to 400 for various other high unsaturation synthetic rubbers), it has been difficult in the past to make compositions of butyl rubber reinforced with carbon black having a desired combination of high tensile strength, high modulus, good elongation, together with good hysteresis and low internal viscosity. The severely attrited carbon blacks made by the process of the present invention produces outstanding improvements in vulcanized butyl rubber compositions, especially increased tensile strength, elongation, tensile product (product of tensile strength×elongation), extensibility, resilience and abrasion resistance, and reduced hardness or stiffness, and abrasion loss. Just as it has been found that the degree improvement in the carbon black effected by the severe attrition may be judged in at least a superficial way by the increase in the ratio of area/pH (for instance an increase of this value from 10 to 40 for a furnace black), it has also been found that the degree of improvement in over-all resiliency properties of the vulcanized butyl rubber may be judged by an increase in the ratio of tensile-product divided by the internal viscosity (e.g. an increase in this value from about 20 to about 80) and it has been found that the increase in strength and resiliency of the vulcanized rubber (as indicated by internal viscosity/tensile product) is directly proportional to the increase in the area/pH of the attrited carbon black. In other words, the more severely the carbon black is attrited, the greater is the improvement in strength and resiliency of butyl rubber vulcanizates containing the attrited carbon black.

The severely attrited carbon blacks can also be compounded with halogen-containing butyl rubber compositions such as are made by chlorinating or brominating butyl rubber, preferably in a manner which does not substantially degrade the molecular weight thereof. More particularly, in producing halogenated butyl rubber, the halogenation is regulated so that the resulting rubber will contain at least about 0.5 weight percent (preferably at least about 1.0 weight percent) combined halogen but not more than about "X" weight percent combined chlorine or 3.0 "X" weight percent combined bromine wherein:

$$X = \frac{M_3 L}{(100-L)M_1 + L(M_2 + M_3)} \times 100$$

and $L$=mole percent of the multiolefin in the polymer
$M_1$=molecular weight of the isoolefin
$M_2$=molecular weight of the multiolefin
$M_3$=atomic weight of chlorine or bromine Suitable halogenating agents which may be employed are gaseous chlorine, liquid bromine, alkali metal hypochlorites or hypobromites, $C_4$ to $C_{10}$ tertiary alkyl hypochlorites, sulfur bromides, sulfuryl chloride, pyridinium chloride perchloride, N-bromosuccinimide, alpha - chloroaceto - acetanilide. N,N′ - dichloro - 5,5-dimethylhydantoin, iodine halides, trichlorophenol chloride, N-chloroacetamide, beta-bromo-methyl phthalimide, etc. The preferred halogenating agents are gaseous chlorine, liquid bromine, sulfuryl chloride, sulfuryl bromide, chlorohydantoins, brom-hydantoins, iodine monochloride, and related materials.

The halogenation is preferably conducted at temperatures of above 0° to about 100° C., preferably about 10 or 20° C. to about 60° C., depending upon the particular halogenating agent, for about 1 minute to several hours, preferably by halogenation of a solution of the polymer in an inert solvent.

Although the invention is considered to be outstandingly applicable to the compounding of butyl rubber, nevertheless some substantial improvements can also be effected when compounding the novel carbon blacks of this invention with other types of rubbers, or vulcanizable elastomers such as natural rubber or high unsaturation synthetic rubber such as GR–S (butadienestyrene rubber), butadiene acrylonitrile rubber, neoprene, etc.

When making any of the above-mentioned types of rubber compounds, particularly in the case of butyl rubber, it may be desirable to add about 5 to 100, preferably about 10 to 30 parts by weight of a plasticizer oil per 100 parts of rubber. Such an oil is desirably a mineral or petroleum oil, of a paraffinic, naphthenic, or aromatic type, having a viscosity of about 35 to 400 S.S.U., preferably about 40 to 200 S.S.U. (seconds Saybolt Universal), at 210° F., and having a relatively low unsaturation, e.g. I No. below 30 cg./g., so as to not interfere seriously with the curing of the resulting rubber composition. Also, some of the various ester type plasticizers may be used, e.g. dibutyl phthalate, dihexyl sebacate, trioctyl phosphate, etc. An advantage of using for instance 5 to 20 parts of mineral oil plasticizer per 100 parts of butyl rubber compounded with 50 parts of severely roll-milled furnace black, is that it reduces the abrasion loss ratio: $K/R$, about 20 to 50% compared to a composition containing roll-milled carbon black but without any mineral oil plasticizer, or that it produces a reduction of from about 30 to 60% compared to similar compositions containing the mineral oil plasticizer, but containing ordinary furnace black instead of roll-milled furnace black.

If desired, before adding vulcanizing agents, shaping, and curing, to make finished articles such as auto tires, either of the tube-containing, or of the tubeless type, or of parts thereof such as the carcass, tread, sidewall, or the airholding innerliner, or for making any other shaped articles, the severely attrited carbon black of this invention may first be mixed with the rubber to be used, particularly a butyl rubber, and then subjected to a heat-interaction, to promote a formation of bonds between the carbon black and the butyl rubber. This heat treatment may be either static, dynamic, as in a Banbury mixer or on heated steel rolls, or a combination cyclic treatment such as by 2 to 10 or 15 repeated cycles of static heating for 10 minutes to an hour, followed by mixing for 1 to 3 or 5 minutes. The heat-treatment should generally be carried out at a temperature of about 250 to 500° F., preferably about 300 to 450° F., inversely for a period of time ranging from about 5 or 10 minutes up to 8 hours. A preferred heat-treatment is mixing in a Banbury at about 300 to 400° F. for about 5 to 15 minutes, or, in the case of static heating, about 1 to 4 hours at about 300 to 350° F. Such a heat-treatment gives a combination of high 300% modulus and high tensile of 50% or so greater than obtained with unattrited carbon black either with or without heat-treatment, and also better than even a ball-milled carbon black without the heat-treatment of the mixture of butyl rubber and carbon black.

Since it is known that channel blacks respond to heat-treatment with butyl rubber without promoters, but furnace and thermal blacks don't respond unless a promoter is present, it is remarkable that the roll-milled furnace and thermal blacks of this invention do respond to heat-treatment with butyl rubber even without any promoter. Thus, by the severe attrition, the furnace and thermal blacks are modified so they behave like channel black, or even are superior to it. These modified products have a low pH (3–5) like channel blacks; but they have lower structure than normal channel blacks have.

The heat-interaction with butyl rubber increases the percent of bound rubber to about 20 to 50%, and thus assists in imparting better elasticity and lower internal viscosity to the products when vulcanized.

If desired, in carrying out such a heat-interaction of the attrited carbon black with butyl rubber or any other type of rubber, various heat-interaction promoters may be used, such as about 0.1 to 1.0% of Polyac (paradinitroso-benzene), GMF (paraquinone-dioxime), sulfur, or various sulfur-containing compounds such as Tuads (tetra-methylthiuramdisulfide), paranitrosophenol, N,4-dinitroso-N-methylaniline, etc. When any of these promoters are used, it is preferred to use the dynamic or hot-milling process for effecting the heat-interaction and it is desirable to not use an excess of the promoter such as may cause scorching.

Vulcanized compositions of butyl rubber containing carbon black which has been severely attrited according to the present invention by roll-milling between tightly set steel rolls, are accordingly superior for use in tires, of either the tube-containing or tubeless types, for autos, trucks, airplanes, etc., or for tread surfaces to be applied onto a carcass of any type of rubber. These compositions also give outstandingly superior service in other industrial applications where they are subject to both abrasion and repeated flexing, such as conveyor belts, for handling crushed stone, ore, coal, or other materials having an abrading influence, etc., as well as other uses such as shoes, boots, tractor treads, fan belts, power transmission belts, etc.

These severely attrited carbon blacks can also be used for various non-rubber-reinforcing purposes, as for instance for compounding with high molecular weight plastics, e.g. polyethylene, polypropylene, polystyrene, polyvinyl chloride and various copolymers, either to improve the physical properties of the compositions and/or to assist in protecting them against the degradative depolymerizing effect of ultraviolet light and sunlight, or chemical influences such as oxygen, ozone, etc.

Figure 2:
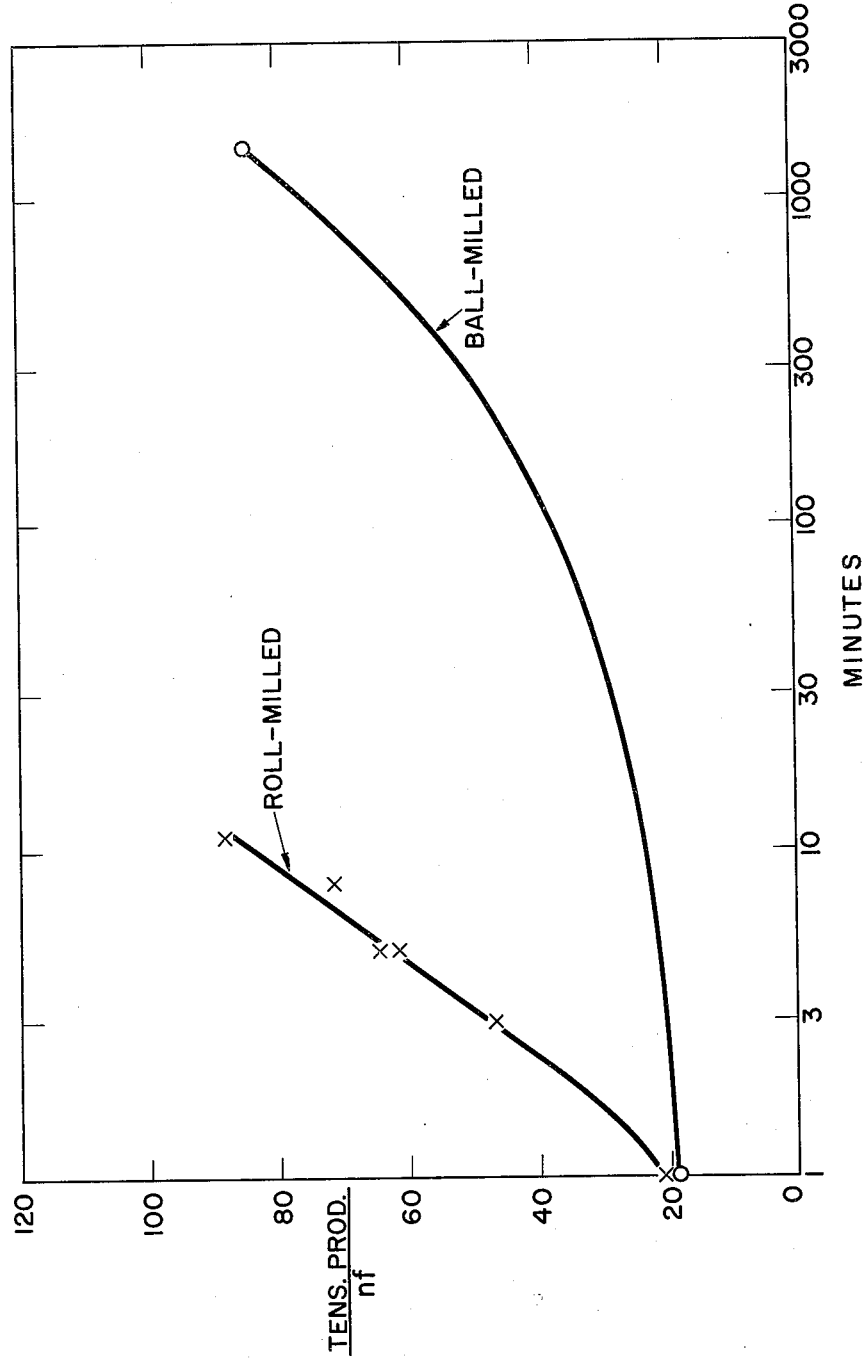
Figure 3:
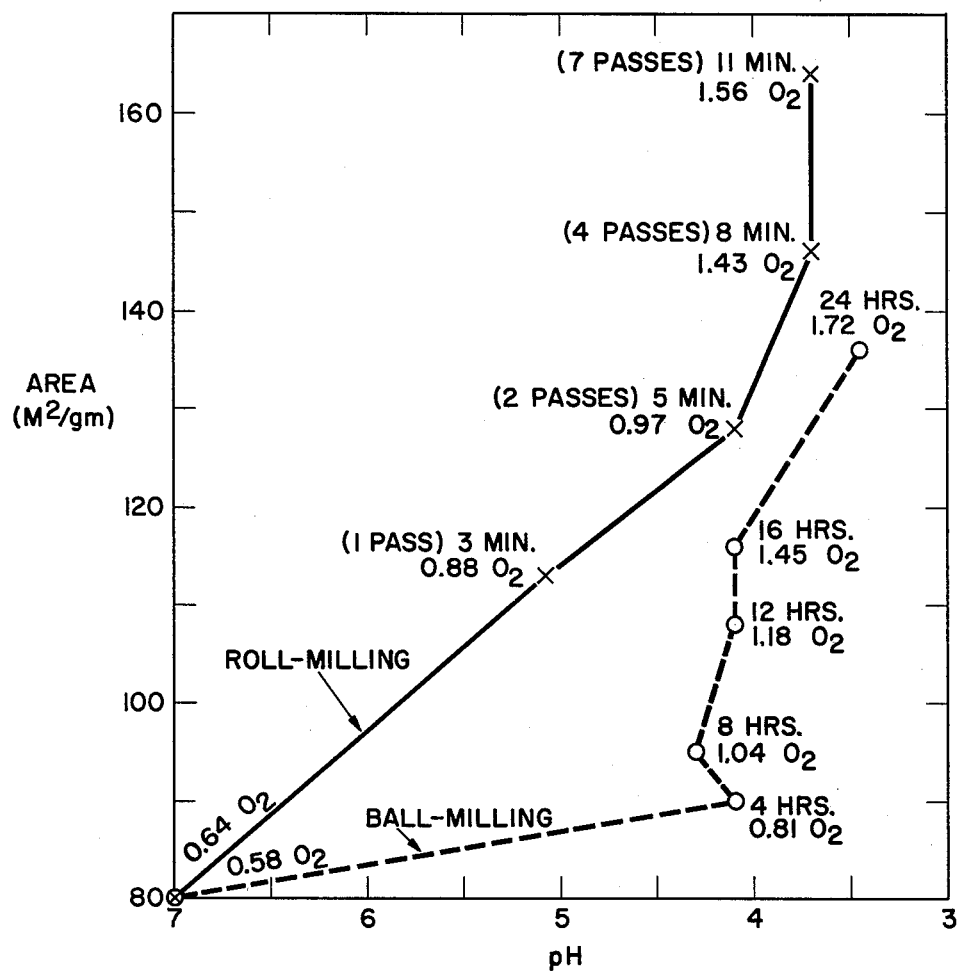

The details, objectives, and advantages of the present invention will be more apparent from the following experimental data, particularly when read in conjunction with the accompanying drawings which are charts showing the change in properties of carbon black resulting from attrition, and corresponding improvements in butyl rubber vulcanizates containing the improved attrited carbon black. More specifically, FIGURE 1 is a chart on which the area/pH of a carbon black (HAF furnace black) is plotted against time in minutes (on a logarithmic scale), for a roll-milled carbon black in curve A, and for a ball-milled black in curve B. FIGURE 2 is a chart on which the ratio of $$\frac{\text{Tensile-product } (\times 10^{-4})}{\text{Internal viscosity } (nf \times 10^{-6})}$$

of butyl rubber vulcanizates containing roll-milled carbon black in curve A, and ball-milled carbon black in curve B, is plotted against time (in minutes on a logarithmic scale) of the attrition treatment. FIGURE 3 is a chart on which the area ($M^2$/gm.) is plotted against pH for a furnace black attrited by roll-milling (in curve A) and by ball-milling (in curve B) during the course of attrition. The data and interpretations of these charts will be discussed herebelow in connection with the examples.

EXAMPLE 1

A portion of Philblack A, which is a high modulus furnace black (HMF), was passed three times through a pair of rubber mill steel rolls, with a tight setting of 7 mils (0.007") between the steel rolls. The structure (oil absorption value) was reduced from 14.2 to 7.38 gal./100 lbs.; and the pH was reduced from 6.6 to 5.5.

Butyl rubber vulcanizates were made with this roll-milled carbon black, using 50 parts of black per 100 of the rubber, and using the following compounding and curing formulation:

| | Parts by weight |
|---|---|
| Butyl rubber | 100.0 |
| Carbon black | 50.0 |
| Stearic acid | 0.5 |
| Zinc oxide | 5.0 |
| Sulfur | 2.0 |
| Tetramethylthiuram disulfide | 1.0 |
| 2,2'-benzothiazyldisulfide | 1.0 |

The following data were obtained on the physical, dynamic, and electrical resistivity properties of the resulting vulcanizates as follows:

*Table 1*

PHILBLACK A ATTRITED BETWEEN STEEL ROLLS

| | Control | Attrited |
|---|---|---|
| Tensile strength, lbs./in.$^2$ | 2,080 | 2,460 |
| Percent Elongation | 410 | 515 |
| Tens. prod. ($\times 10^{-4}$) | 85 | 127 |
| Modulus at 300% | 1,610 | 1,010 |
| Electrical Resistivity (ohm cm.) | $8.01 \times 10^7$ | $3.18 \times 10^{13}$ |
| Dynamic Properties: | | |
| (1) $nf \times 10^{-6}$, Poises$\times$c.p.s | 2.98 | 1.44 |
| (2) $K \times 10^{-7}$, Dynes/cm.$^2$ | 8.76 | 5.57 |
| (3) Relative Damping (Percent) | 23.9 | 18.8 |
| Tens. prod. $(10^{-4})$ / $nf \times 10^{-6}$ | 29 | 88 |

These data show that severe roll-milling attrition of a high modulus furnace black, by three passes through tight-set steel rolls effects a substantial increase in tensile strength (2080 to 2460 p.s.i.), elongation (410 to 515%), resulting tensile-product $\times 10^{-4}$ (85 to 127), a tremendous increase in electrical resistivity ($8.01 \times 10^7$ up to $3.18 \times 10^{13}$ ohm cm.), and far superior dynamic properties, as indicated by a reduction in internal viscosity, $nf \times 10^{-6}$ (from 2.98 down to 1.44), and a tremendous increase in the over-all resiliency factor of $$\frac{\text{Tensile-product} \times 10^{-4}}{nf \times 10^{-6}}$$

(from 29 up to 88).

EXAMPLE 2

Another sample of Philblack A was similarily passed three times through a laboratory rubber mill (6" x 12") with the steel rolls set at 0.007–0.010" apart, and with the rolls cool (80–90° F.). The structure of the black was reduced from 14.04 to 6.50 gallons per 100 lbs., and the pH was reduced from 7.38 to 5.50.

EXAMPLE 3

Philblack O, which is a high abrasion furnace black (HAF), was subjected to severe roll-attrition in a more extensive and more carefully controlled series of tests consisting of 7 passes through the steel rolls of a laboratory rubber mill, in which the roll speed ratio was about 1.4:1, and the roll setting was about 6 mils, and having been preheated to 300° F. The HAF furnace black had previously been dried by heating it about 48 hours at about 135° C. The temperature of the carbon black coming through the mill was taken after each of the 7 passes. Samples of about 225 grams each were taken out for testing and evaluation, after the first pass, second pass, fourth pass and seventh pass, and the time was recorded when those samples were taken.

These samples of roll-attrited carbon black, and a control sample for comparison, were tested for area, pH, and percent oxygen, and the calculated value of area/pH. The results obtained were as follows:

*Table 2*

PROPERTIES OF ROLL-MILLED CARBON BLACK (HAF)

| Minutes | Pass | Temp. After Pass, °C. | pH | Area $M^2$/gm. | Area/pH | Percent $O_2$ | Percent Increase in Area |
|---|---|---|---|---|---|---|---|
| 0 | Control | | 7.0 | 80 | 11.4 | 0.64 | |
| 3 | 1 | 385 | 5.08 | 113 | 22.2 | 0.88 | 41 |
| 5 | 2 | 255 | 4.1 | 128 | 31.2 | 0.97 | 60 |
| | 3 | 240 | | | | | |
| 8 | 4 | 245 | 3.7 | 146 | 39.4 | 1.43 | 82 |
| | 5 | 235 | | | | | |
| | 6 | 295 | | | | | |
| 11 | 7 | 320 | 3.68 | 164 | 44.5 | 1.56 | 105 |

The above data in Table 2 show that by the severe and rapid roll-milling, the pH of this furnace black was reduced from 7.0 to 5.08 in one pass, to 4.1 after the second pass, and down to 3.68 after the seventh pass. Simultaneously, the area ($M^2$ per gm.) was increased very rapidly from 80 to 113 in the first pass and then more slowly on up to 164 after the seventh pass. The calculated ratio of area/pH, which has been found to give an approximate indication of value of the carbon black in improving the toughness and resiliency of butyl vulcanizates made therewith was thus increased rapidly from 11.4 to 22.2 in the first pass, and to 31.2 after the second pass, and then more slowly on up to 44.5 after the seventh pass, thus making a 4-fold increase in area/pH in seven passes which only required a total time of 11 minutes. During this attrition, the percent oxygen was correspondingly increased from 0.64 to 0.88 in the first pass, and then on up to 1.56 after the seventh pass.

For comparison or contrast, corresponding data are submitted herebelow in Table 3 to show the corresponding change in those same properties as effected by ball-milling over the slower but longer period of 24 hours, making tests on samples taken out after 4, 8, 12, 16 and the final 24 hours, using steel balls according to the general procedure described in parent application S.N. 663,002.

*Table 3*

PROPERTIES OF BALL-MILLED CARBON BLACK (HAF)

| Hours | pH | Area $M^2$/gm. | Area/pH | Percent $O_2$ | Percent Increase in Area |
|---|---|---|---|---|---|
| 0 | 7.0 | 80 | 11.4 | 0.58 | (Control) |
| 4 | 4.1 | 90 | 22.0 | 0.81 | 13 |
| 8 | 4.3 | 95 | 22.1 | 1.04 | 19 |
| 12 | 4.1 | 108 | 26.4 | 1.18 | 35 |
| 16 | 4.1 | 116 | 28.3 | 1.45 | 45 |
| 24 | 3.45 | 136 | 39.4 | 1.72 | 70 |

The above data in Table 3 show that the ball-milling of the furnace black reduces the pH very rapidly from 7.0 to 4.1 in the first four hours of ball-milling, with little or no change in pH through the 16 hour period and only a very slight reduction to 3.45 after 24 hours of ball-milling. Simultaneously, the area was only increased very slightly from 80 to 90 in the first four hours and still only slightly to 95 after 8 hours, but somewhat more rapidly up to 136 after the 24 hours. The corresponding calculated value of the area/pH increased to 22.0 after 4 hours of ball-milling and then gradually went up to 39.4 after 24 hours of ball-milling. The percent of oxygen on the black increased from 0.58 to 1.72 at the end of 24 hours of ball-milling.

Thus it is seen that the roll-milling (in Table 2) effected as great an increase in the area/pH of from 11.4 to 22.2 in one pass (in only 3 minutes) as did the ball-milling (Table 3) in 4 hours (from 11.4 to 22.0). The total of seven passes of roll-milling (which consumed only 11 minutes' time) raised the area/pH value from 11.4 to 44.5, whereas even the 24 hours of ball-milling only raised it from 11.4 to 39.4. These figures are set forth graphically in FIGURE 1 of the accompanying drawings, where curve A shows the area/pH for the roll-milled carbon black, plotted against time, while curve B shows the corresponding values for the ball-milled carbon black.

On the other hand, as shown by the columns representing pH and area in Tables 2 and 3, the course of physical and chemical reactions involved in the roll-milling are shown to be surprisingly very different from the ball-milling are shown to be surprisingly very different from the ball-milling. These data on area and pH are set forth graphically in FIGURE 3 of the accompanying drawings. In this FIGURE 3, the area is plotted against the pH for the roll-milling in curve A and the ball-milling in curve B, each curve showing the points in time of attrition at which the tests of area and pH were made, and also showing at each point the percent oxygen in the attrited carbon black. These curves show that the initial (4 hour) effect of the ball-milling is almost entirely a lowering of the pH with not more than an almost insignificant increase in area, whereas with the roll-milling, the initial effect involves both a rapid increase in area together with a substantial lowering of the pH, although this latter is not as rapid as in the case of the initial ball-milling. Thus, the roll-milling of the present invention provides an extremely rapid and effective method of increasing the area of a carbon black, which apparently cannot be done to any substantial extent by ball-milling until after an initial four-hour period.

A further interesting observation from Table 2 is that the temperature of the attrited carbon black is raised extremely rapidly in the first pass through the tight steel rolls, from a preheated value of 300° F. (149° C.) up to 700° F. (385° C.) in the first pass, due to the exothermic heat of reaction, i.e. believed due chiefly to oxidation of the black, probably chiefly at the places where carbon structure bonds were broken due to the severe shearing action of the roll-attrition. In succeeding passes through the roll mill, the temperature of the attrited carbon black decreased gradually over the range of 491 to 455° F. (from 255 to 235° C.) and then in the sixth pass rose to 295° C. and in the seventh pass to 320° C.

EXAMPLE 4

The four different samples of roll-attrited Philblack O, the properties of which were set forth above in Table 2, were then compounded with a commercial butyl rubber called Enjay Butyl 217, which has a mole percent unsaturation of about 1.5 to 2.0 and a Mooney value (8 minutes at 212° F.) of about 61 to 70, in the following recipe:

| | Parts by weight |
|---|---|
| Butyl rubber | 400.0 |
| Carbon black | 200.0 |
| Stearic acid | 2.0 |

These materials were mixed on a cool rubber mill (at about 90 to 120° F.). Then this master batch was divided in half, and one-half of it was heat-interacted by hot milling for 10 minutes at 300° F., in order to form rubber-to-carbon-black bonds, after which it was permitted to cool to room temperature. Then curatives were added to each batch (the control, and the heat-interacted portion) according to the following formulation:

| | Parts |
|---|---|
| Zinc oxide | 10.0 |
| Sulfur | 4.0 |
| Tuads | 2.0 |
| Altax | 2.0 |

The resulting compositions were then cured for 45 to 50 minutes at 307° F., and tested for physical and dynamic properties. Table 4 gives the properties of the vulcanizates containing the samples of roll-milled furnace black which had not been heat interacted with the butyl rubber prior to curing; and Table 5 shows the properties of the vulcanizates containing the roll-milled furnace black which had been heat interacted with the butyl rubber before addition of curatives and vulcanizing. Each table also shows the properties of the vulcanizates containing the control samples of the carbon black which had not been roll-milled. Table 4 also, for comparison, shows a few of the most pertinent properties of a corresponding vulcanizate containing the same type of furnace black which had been attrited by ball-milling 24 hours with steel balls instead of by roll-milling.

Table 4

BUTYL RUBBER VULCANIZATES CONTAINING ROLL-MILLED PHILBLACK (HAF)

| No. Passes in Roll Mill | Not Heat Treated | | | | | Ball-milled HAF |
|---|---|---|---|---|---|---|
| | 0 | 1 | 2 | 4 | 7 | |
| Modulus at 100% (Lbs./In.²): | 420 | 265 | 240 | 200 | 180 | 195 |
| 200% | 1,070 | 690 | 700 | 535 | 465 | 535 |
| 300% | 1,800 | 1,325 | 1,365 | 1,115 | 930 | 1,175 |
| 400% | 2,360 | 2,050 | 2,115 | 1,820 | 1,560 | 2,040 |
| 500% | | 2,675 | 2,775 | 2,590 | 2,250 | 2,850 |
| Tensile Strength, Lbs./In.² | 2,450 | 2,750 | 2,880 | 2,900 | 2,800 | 3,170 |
| Percent Elongation | 430 | 520 | 535 | 560 | 685 | 560 |
| Dynamic Properties: | | | | | | |
| 1. $nf \times 10^{-6}$ Poises × cps | 5.05 | 3.06 | 2.51 | 2.11 | 1.85 | (1.97) |
| 2. $K \times 10^{-7}$ Dynes Km.² | 10.7 | 7.92 | 7.00 | 6.51 | 5.83 | 6.47 |
| 3. Percent Relative Damping | 37.6 | 32.1 | 30.1 | 27.6 | 27.0 | 21.7 |
| Tensile Product ×10⁻⁴ | 105 | 143 | 154 | 162 | 164 | 177 |
| Tensile Product/$nf$ | 20.8 | 46.8 | 61.4 | 71.6 | 88.5 | (.90) |

The above Table 4 shows that severe attrition of the furnace black (HAF) by passing it through tightly set steel rolls effect such great improvements in the reinforcing properties, that the tensile strength of butyl rubber vulcanizates containing it are increased from 2450 p.s.i. up to 2750 after the first pass and with a slight further increase to 2800 or 2900 with additional passes, while the elongation is also simultaneously increased from 430 to 520 after the first pass and gradually on up to 585 after the seventh pass. Thus the tensile product (×10⁻⁴) is increased from 105 up to 143 after only one pass and then more slowly on up to 164 after the seventh pass. Likewise, the dynamic properties are greatly improved as shown by the fact that the internal viscosity ($nf \times 10^{-6}$) is reduced from 5.05 to 3.06 after the first pass and then more slowly on down to 1.85 after the seventh pass. The combination of these various properties, or what may be termed over-all resiliency properties, as calculated from the expression:

$$\frac{\text{Tensile-product } (\times 10^{-4})}{\text{Internal viscosity } (nf \times 10^{-6})}$$

has thus been increased from 20.8 up to 46.8 after only one pass and yet continues to increase on up to 88.5 (a total 4-fold improvement) after the seventh pass of the carbon black through steel rolls. This shows that an astounding improvement in the resiliency characteristics of butyl rubber vulcanizates can be made by merely passing a carbon black such as HAF furnace black through tightly set steel rolls even in a single pass which only requires several minutes, or repeated passes, e.g. seven passes which require only a total of 11 minutes.

The last column of Table 4 shows, for comparison some of the corresponding properties of a butyl vulcanizate containing the same type of furnace black which had been attrited by ball-milling for 24 hours with steel balls, as described in parent application S.N. 663,002. It is clear by comparing the previous columns in this table with the last column that the very rapid roll-milling of the furnace black has effected as much improvement in 4 to 7 passes through the steel rolls, only requiring about 8 to 11 minutes as was accomplished by 24 hours of steel ball-milling.

To show this comparison graphically, the over-all resiliency value of $$\frac{\text{Tensile product } (\times 10^{-4})}{\text{Internal viscosity } (nf \times 10^{-6})}$$

is plotted in FIGURE 2 of the accompanying drawings against the time (in minutes, on a logarithmic scale) used in the attrition of the carbon black, for the butyl vulcanizates made with the roll-milled carbon black and the ball-milled carbon black, using the data set forth in Table 4. This FIGURE 2 shows how rapidly the $$\frac{\text{Tensile product } (\times 10^{-4})}{\text{Internal viscosity } (nf \times 10^{-6})}$$

increases from value of 20.8 (in the lower left corner of the chart) up to a value of 88.5 after only 11 minutes of roll-milling, whereas 24 hours (1,440 minutes) of ball-milling are required to produce about the same increase in these over-all resiliency properties.

One reason why FIGURE 1 and FIGURE 2 are shown on the same sheet of drawings is to emphasize the close similarity of curves A and B of FIGURE 2 to curves A and B of FIGURE 1. In fact, if these charts are superimposed on one another, the two "A" (roll-milling) curves substantially coincide and the two "B" (ball-milling) curves also substantially coincide. This is interpreted to mean that the improvement in the butyl vulcanizate over-all resiliency characteristics calculated from the expression $$\frac{\text{Tensile product } (\times 10^{-4})}{\text{Internal viscosity } (nf \times 10^{-6})}$$

(of FIGURE 2) is directly proportional to the increase in the value of area $$\frac{(M^2/\text{gm.})}{pH}$$

of the attrited carbon black per se (of FIGURE 1).

Table 5 shows that some additional improvements, particularly in the dynamic and over-all resiliency characteristics of the butyl rubber vulcanizates, can be obtained by subjecting the roll-milled furnace to heat interaction with the butyl rubber prior to the addition of curatives and curing.

*Table 5*

VULCANIZATES OF BUTYL RUBBER HEAT-TREATED WITH ROLL-MILLED PHILBLACK O (HAF)

| No. Passes in Roll Mill | Heat Treated | | | | |
|---|---|---|---|---|---|
| | 0 | 1 | 2 | 4 | 7 |
| Modulus at 100% (Lbs./In.²): | 375 | 265 | 260 | 220 | 185 |
| 200% | 970 | 740 | 770 | 660 | 550 |
| 300% | 1,700 | 1,505 | 1,595 | 1,445 | 1,185 |
| 400% | 2,355 | 2,320 | 2,440 | 2,290 | 1,950 |
| Tensile Strength, Lbs./In.² | 2,410 | 2,880 | 3,060 | 3,060 | 2,800 |
| Percent Elongation | 430 | 495 | 500 | 505 | 515 |
| Dynamic Properties: | | | | | |
| 1. $nf \times 10^{-6}$ Poises × cps | 4.45 | 2.80 | 2.38 | (1.75) | 1.35 |
| 2. $K \times 10^{-7}$ Dynes Km.² | 9.87 | 7.58 | 7.26 | | 5.36 |
| 3. Percent Relative Damping | 36.4 | 30.9 | 27.9 | | 22.2 |
| Δ 300% Modulus, Lbs./In.² | −100 | +180 | +230 | +330 | +255 |
| Tensile Product ×10⁻⁴ | 104 | 144 | 153 | 155 | 144 |
| Tensile Product/$nf$ | 23.4 | 51.4 | 64.1 | (88.5) | 105.5 |

The above Table 5 shows that slightly higher tensile strengths can be obtained, i.e. about 3060 p.s.i. in the case of the furnace blacks which have been subjected to from 2 to 4 passes through the steel rolls, and then heat interacted with the butyl rubber before addition of curatives and vulcanizates. These data also show that the 300% modulus of the heat treated compositions is not reduced as much as in the case of the corresponding compositions which had not been heat interacted. Table 5, furthermore, shows considerable superior dynamic properties in the heat treated compositions. For instance, the internal viscosity ($nf \times 10^{-6}$) has been reduced from 4.45 to 2.80 after the first pass of the carbon black through the steel rolls, on down to 1.35 after the seventh pass, and the percent relative damping has been reduced from 36.4 down to 22.2 compared to only 27.0 in the case of the corresponding roll-milled furnace black compositions which had not been heat interacted. Finally, in the last line of Table 5, the over-all resiliency characteristics of $$\frac{\text{Tensile product } (\times 10^{-4})}{\text{Internal viscosity } (nf \times 10^{-6})}$$

have been increased from 23.4 to 51.4 after the first pass of the carbon black through the steel rolls, on up to the very high value of 105.5 after the seventh pass, for the heat treated compositions, thus making a 5-fold improvement, compared to a value of only 88.5, i.e. a 4-fold improvement, for the corresponding roll-milled furnace black sample which had not been heat interacted with the butyl rubber prior to curing.

It is not intended that this invention be limited to the specific modifications which have been given merely for the sake of illustration, but only by the appended claim in which it is intended to claim all novelty inherent in the invention as well as all modifications coming within the scope and spirit of the invention.

What is claimed is:

A process which comprises initially preheating the rolls of a roller mill to a temperature of 200 to 500° F. prior to passage of carbon black therethrough, and then attriting a carbon black by roll milling it between said heated rolls having a clearance of less than 50 mils.

References Cited in the file of this patent

UNITED STATES PATENTS

| 2,066,274 | Grote | Dec. 29, 1936 |
| 2,439,442 | Amon et al. | Apr. 13, 1948 |
| 2,509,664 | Amon et al. | May 30, 1950 |
| 2,597,741 | Macey | May 20, 1952 |
| 2,890,839 | Heller | June 16, 1959 |

OTHER REFERENCES

Dobbin et al.: "Ind. and Eng. Chem." 38, 1145–1148 (1946).